United States Patent
He et al.

(10) Patent No.: US 12,051,238 B2
(45) Date of Patent: Jul. 30, 2024

(54) SYSTEM AND METHOD WITH VISUAL CONCEPT FRAMEWORK FOR SELF-SUPERVISED SEMANTIC SEGMENTATION

(71) Applicant: Robert Bosch GmbH, Stuttgart (DE)

(72) Inventors: Wenbin He, Santa Clara, CA (US); Liang Gou, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 17/558,923

(22) Filed: Dec. 22, 2021

(65) Prior Publication Data

US 2023/0196755 A1    Jun. 22, 2023

(51) Int. Cl.
G06V 10/70      (2022.01)
G06N 3/045      (2023.01)
(Continued)

(52) U.S. Cl.
CPC ............. *G06V 10/87* (2022.01); *G06N 3/045* (2023.01); *G06N 3/08* (2013.01); *G06V 10/28* (2022.01); *G06V 10/421* (2022.01)

(58) Field of Classification Search
CPC ...... G06V 10/87; G06V 10/28; G06V 10/421; G06V 10/454; G06V 10/7753;
(Continued)

(56) References Cited

U.S. PATENT DOCUMENTS

2023/0113643 A1* 4/2023 Mittal ................... G06F 16/75
                                                                        382/159

FOREIGN PATENT DOCUMENTS

WO    WO-2023038574 A1 *  3/2023

OTHER PUBLICATIONS

Ke et al., "Universal Weakly Supervised Segmentation By Pixel-To-Segment Contrastive Learning", May 11, 2021, conference paper at ICLR 2021, arXiv:2105.00957v2 [cs.CV], pp. 1-18 (Year: 2021).*

(Continued)

*Primary Examiner* — Chan S Park
*Assistant Examiner* — Daniel C Chang
(74) *Attorney, Agent, or Firm* — Kathy Takeguchi; Maginot, Moore & Beck LLP (57) ABSTRACT

A computer-implemented system and method includes generating first pseudo segment data from a first augmented image and generating second pseudo segment data from a second augmented image. The first augmented image and the second augmented image are in a dataset along with other augmented images. A machine learning system is configured to generate pixel embeddings based on the dataset. The first pseudo segment data and the second pseudo segment data are used to identify a first set of segments that a given pixel belongs with respect to the first augmented image and the second augmented image. A second set of segments is identified across the dataset. The second set of segments do not include the given pixel. A local segmentation loss is computed for the given pixel based on the corresponding pixel embedding that involves attracting the first set of segments while repelling the second set of segments. The global concept loss is computed based on a similarity determination between the first set of segments and a concept vector of a corresponding concept. The corresponding concept categorizes the first set of segments with other sets of segments across the dataset based on semantic meaning. The parameters of machine learning system are updated based on the total loss that takes into account at least the local segmentation loss and the global concept loss.

20 Claims, 7 Drawing Sheets

(51) Int. Cl.
*G06N 3/08* (2023.01)
*G06V 10/28* (2022.01)
*G06V 10/42* (2022.01)

(58) Field of Classification Search
CPC .... G06V 10/82; G06V 10/7715; G06N 3/045; G06N 3/08; G06N 3/0455; G06N 3/0464; G06N 3/0895
See application file for complete search history.

(56) References Cited

OTHER PUBLICATIONS

Bau et al., "Network Dissection: Quantifying Interpretability of Deep Visual Representations," arXiv: 1704.05796v1 [cs. CV], Apr. 19, 2017, pp. 1-9.

Kim et al., "Interpretability Beyond Feature Attribution: Quantitative Testing With Concept Activation Vectors (TCAV)," arXiv:1711.11279v5 [stat.ML], Jun. 7, 2018, pp. 1-18.

Chen et al., "A Simple Framework for Contrastive Learning of Visual Representations," arXiv:2002.05709v3 [cs.LG], Jul. 1, 2020, pp. 1-20.

He et al., "Momentum Contrast for Unsupervised Visual Representation Learning," arXiv:1911.05722v3 [cs.CV], Mar. 23, 2020.

Hwang et al., "SegSort: Segmentation by Discriminative Sorting of Segments," arXiv:1910.06962v2 [cs.CV], Oct. 30, 2019, pp. 1-17.

Zhang et al., "Self-Supervised Visual Representation Learning from Hierarchical Grouping," arXiv:2012.03044v1 [cs. CV], Dec. 5, 2020, pp. 1-12.

Van Gansbeke et al., "Unsupervised Semantic Segmentation by Contrasting Object Mask Proposals," arXiv:2012.06191v3 [cs.CV], Aug. 3, 2021, pp. 1-14.

Everingham et al., "The PASCAL Visual Object Classes Challenge—a Retrospective," International Journal of Computer Vision, pp. 1-38.

Pont-Tuset et al., "The 2017 DAVIS Challenge on Video Object Segmentation," arXiv:1704.00675v3 [cs.CV], Mar. 1, 2018, pp. 1-6.

Van Den Oord et al., "Neural Discrete Representation Learning," 31st Conference on Neural Information Processing Systems (NIPS 2017), Long Beach, CA, arXiv:1711.00937v2 [cs.LG], May 30, 2018. pp. 1-11.

Ke et al., "Universal Weakly Supervised Segmentation by Pixel-to-Segment Contrastive Learning," published as a conference paper at ICLR 2021, pp. 1-12.

Gansbeke et al., "Unsupervised Semantic Segmentation by Contrasting Object Mask Proposals," arxiv.org, Cornell University Library, 201 Olin Library, Cornell University, Ithaca, NY, 14853, Mar. 29, 2021, XP081902727, pp. 1-14.

\* cited by examiner

SYSTEM AND METHOD WITH VISUAL CONCEPT FRAMEWORK FOR SELF-SUPERVISED SEMANTIC SEGMENTATION

FIELD

This disclosure relates generally to machine learning systems, and more particularly to self-supervised semantic segmentation based on visual concepts.

BACKGROUND

In general, semantic segmentation involves partitioning an input image into semantically meaningful regions at the pixel level and assigning each region with a semantic label such as cars, people, and dogs. Recently, semantic segmentation models with deep convolutional neural networks (CNNs) have shown promising results on popular benchmarks. However, these approaches rely heavily on pixel-wise annotations, which cost significant amounts of time and money to acquire.

With recent advances in self-supervised learning, effective visual representations can be learned from images without additional supervision. However, many self-supervised representation learning frameworks (e.g., SimCLR and MOCO) largely focus on the visual representation of a whole image and mostly require curated single-object images. Only a few recent self-supervised approaches learn visual representations at the pixel level for complex scenes, including SegSort, Hierarchical Grouping, and MaskContrast. However, these methods largely emphasize pixels' local affinity information at an individual image level, but ignore the global semantics in the whole dataset, and thus tend to separate the representation of objects from different images even when these objects belong to the same concept. Accordingly, despite these advances in self-supervised learning for individual images, unsupervised semantic segmentation with pixel-level representations is still a challenging task and remains underexplored.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes generating a first augmented image from a source image. The first augmented image is included in a dataset with other augmented images based on other source images. The method includes generating first pseudo segment data based on the first augmented image. The method includes generating other pseudo segment data based on the other augmented images. The method includes generating, via a machine learning system, pixel embeddings for the dataset. The pixel embeddings include a corresponding pixel embedding for a given pixel. The method includes identifying a corresponding segment of the given pixel and non-corresponding segments of the given pixel within the first augmented image via the first pseudo segment data. The method includes identifying other segments for the other augmented images via the other pseudo segment data. The method includes identifying a corresponding concept associated with the corresponding segment. The method includes identifying additional segments in the dataset that are associated with the corresponding concept. The additional segments are a subset of the other segments. The method includes computing a first contrastive loss for the given pixel based on the corresponding pixel embedding in relation to (a) a first positive sample that includes the corresponding segment, and (b) a first negative sample that includes the non-corresponding segments and the other segments. The method includes computing a second contrastive loss for the given pixel based on the corresponding pixel embedding in relation to (a) a second positive sample that includes a co-occurring segment set, where the co-occuring segment set includes the corresponding segment, the non-corresponding segments, and the additional segments and (b) a second negative sample that includes remaining segments of the dataset after removing the co-occurring segment set. The method includes optimizing a total loss for the given pixel. The total loss takes into account the first contrastive loss and the second contrastive loss. The method includes updating parameters of the machine learning system based on the total loss.

According to at least one aspect, a computer-implemented method includes obtaining a source image. The method includes generating a first augmented image and a second augmented image from the source image. The method includes generating first image segmentation data from the first augmented image. The method includes generating second image segmentation data from the second augmented image. The method includes generating, via a machine learning system, pixel embeddings for the dataset. The pixel embeddings include a corresponding pixel embedding for a given pixel. The method includes identifying a first set of segments that the given pixel belongs in the first augmented image and the second augmented image via the first image segmentation data and the second image segmentation data. The method includes identifying a second set of segments across the dataset. The second set of segments do not include the given pixel. The method includes computing a local segmentation loss for the given pixel based on the corresponding pixel embedding that involves attracting the first set of segments while repelling the second set of segments. The method includes computing a global concept loss based on a similarity determination between the first set of segments and a concept vector of a corresponding concept. The corresponding concept categorizes a global set of segments based on semantic meaning. The global set of segments include the first set of segments and other sets of segments with the same semantic meaning across the dataset. The method includes optimizing a total loss that takes into account the local segmentation loss and the global concept loss. The method includes updating parameters of machine learning system based on the total loss.

According to at least one aspect, a non-transitory computer readable medium has computer readable data including instructions stored thereon. The computer readable data is executable by one or more processors to perform a method. The method includes obtaining a source image. The method includes generating a first augmented image and a second augmented image from the source image. The method includes generating first image segmentation data from the first augmented image. The method includes generating second image segmentation data from the second augmented image. The method includes generating, via a machine learning system, pixel embeddings for the dataset. The pixel embeddings include a corresponding pixel embedding for a given pixel. The method includes identifying a first set of segments that the given pixel belongs in the first augmented image and the second augmented image via the first image segmentation data and the second image segmentation data. The method includes identifying a second set of segments across the dataset. The second set of segments do not include the given pixel. The method includes computing a local segmentation loss for the given pixel based on the corresponding pixel embedding that involves attracting the first set of segments while repelling the second set of segments. The method includes computing a global concept loss based on a similarity determination between the first set of segments and a concept vector of a corresponding concept. The corresponding concept categorizes a global set of segments based on semantic meaning. The global set of segments include the first set of segments and other sets of segments with the same semantic meaning across the dataset. The method includes optimizing a total loss that takes into account the local segmentation loss and the global concept loss. The method includes updating parameters of machine learning system based on the total loss.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
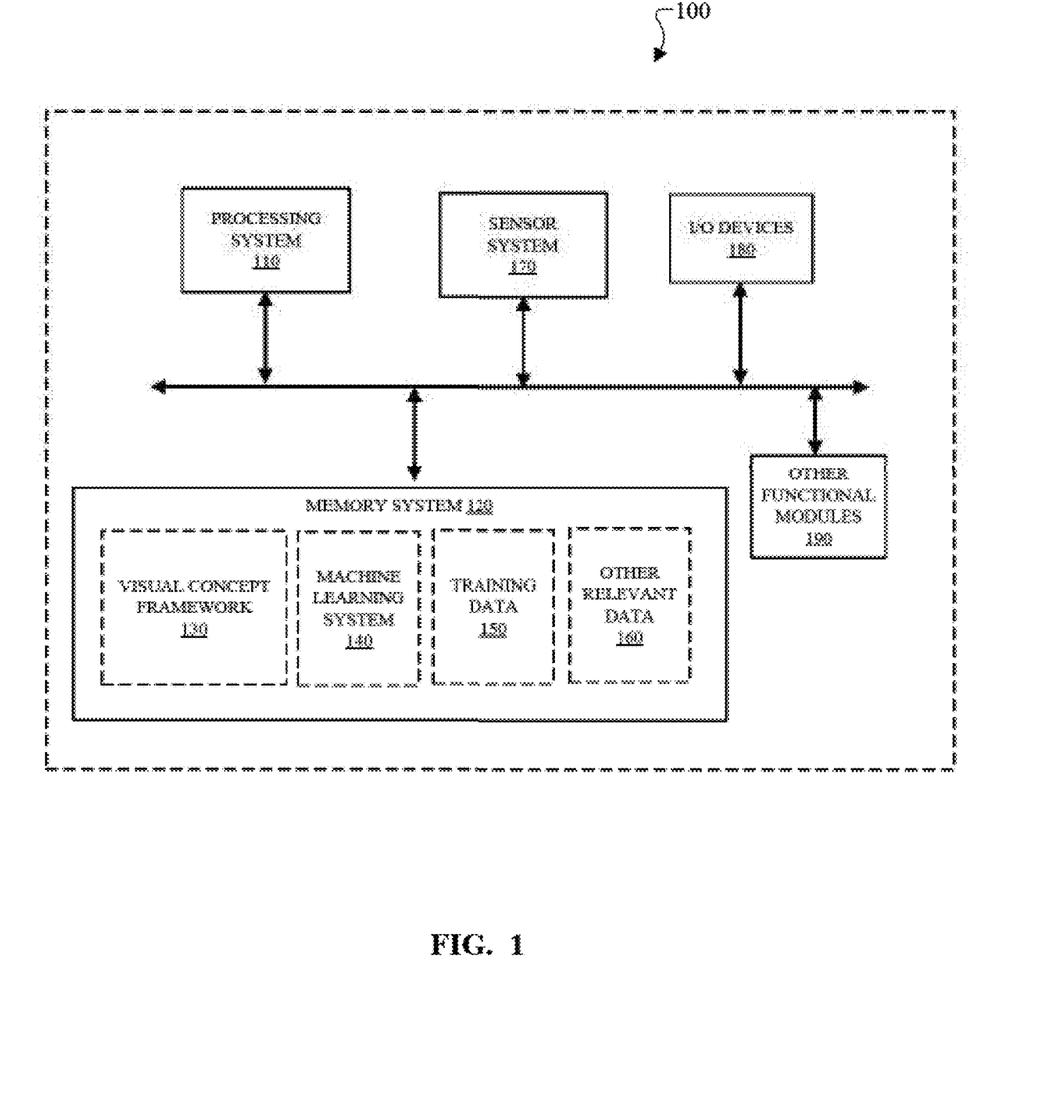
FIG. 1 is a diagram of an example of a system relating to a visual concept framework for self-supervised semantic segmentation according to an example embodiment of this disclosure.

FIG. 1 is a diagram of a non-limiting example of a system 100, which is configured to train, employ, and/or deploy at least one machine learning system 140 according to an example embodiment of this disclosure. The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a visual concept framework 130, the machine learning system 140, training data 150, and other relevant data 160, which are stored thereon.

The visual concept framework 130 includes computer readable data with instructions, which, when executed by the processing system 110, is configured to provide and implement a self-supervised semantic segmentation, which is grounded in visual concepts, to at least one machine learning system 140. The computer readable data can include instructions, code, routines, various related data, any software technology, or any number and combination thereof. In an example embodiment, the machine learning system 140 includes a CNN, any suitable encoding network, any suitable artificial neural network model, or any number and combination thereof. Also, the training data 150 includes a sufficient amount of sensor data, dataset data, source image data, augmentation data, pseudo segment data, various loss data, various weight data, and various parameter data, as well as any related machine learning data that enables the system 100 to provide the visual concept framework 130, as described herein. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate image data based on the sensor data. In this regard, the processing system 110 is configured to obtain the sensor data directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. image data) in connection with the visual concept framework 130, the machine learning system 140, the training data 150, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described herein. In this regard, the system 100 is operable to at least train, employ, and/or deploy the machine learning system 140 (and/or the visual concept framework 130), as described herein.

Figure 2:
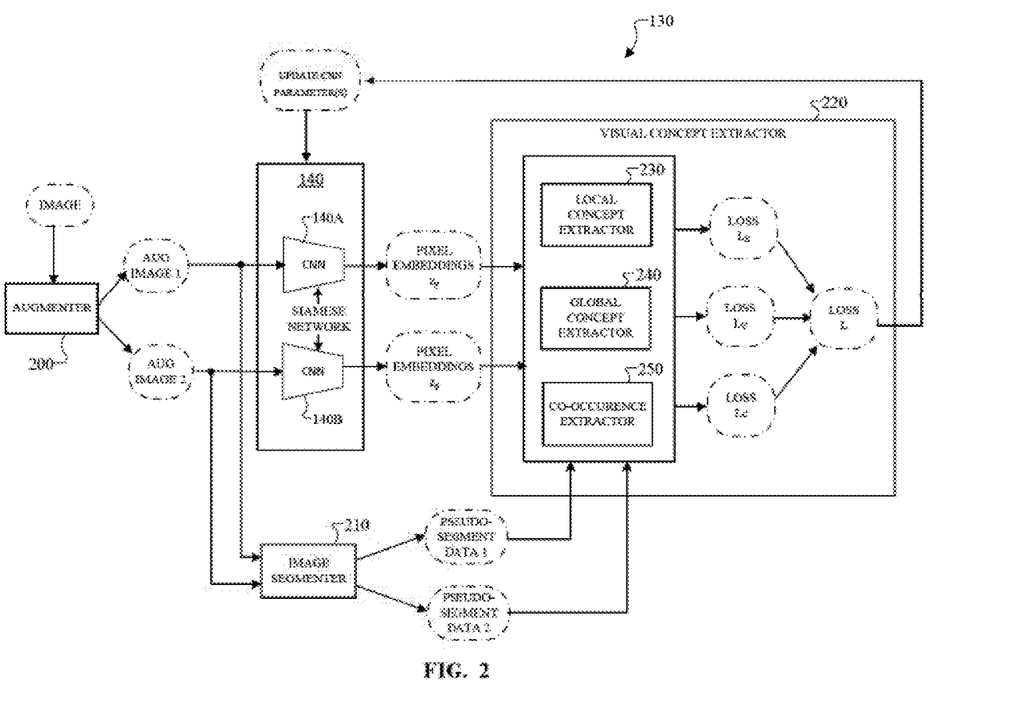
FIG. 2 is a diagram of an example of an architecture of the visual concept framework according to an example embodiment of this disclosure.

FIG. 2 is a diagram of an example of an architecture of the visual concept framework 130 according to an example embodiment. As an overview, the visual concept framework 130 is configured to provide self-supervised pixel representation learning method for visual concept extraction by leveraging various properties of visual concepts at both local and global levels. In this regard, visual concepts can be informally defined as human-interpretable abstractions of image segments with semantic meanings (e.g., parts, objects, and visual scenes). As such, visual concepts may be used in the field of explainable artificial intelligence (AI) for model interpretation and validation. Since visual concepts are an aggregation of the image datasets and are human interpretable, they are widely used in understanding and validating how a model performs over different concepts. The visual concept framework 130 is configured to leverage visual concepts to provide a unified framework to drive self-supervision priors at both local and global levels using pseudo segment data.

The visual concept framework 130 is configured to identify and use at least three types of relationships between pixels and visual concepts to guide self-supervised learning. More specifically, the visual concept framework 130 is configured to leverage a relationship between pixels and local concepts (i.e., visually coherent regions in each image). In this regard, the visual concept framework 130 uses contrastive learning to force the pixels, which are identified as being in the same pseudo segments, to move close in the embedding space, and push pixels, which are identified as being from either different pseudo segments or different images, to move far away in the embedding space. In addition, the visual concept framework 130 groups local concepts with similar semantic meanings into global concepts with a vector quantization (VQ) method. In this regard, the visual concept framework 130 includes a VQ dictionary, which learns discrete representations of global concepts by pushing each local concept from an image to its closest global concept vector. Also, the visual concept framework 130 leverages the co-occurrence of different global concepts because relevant global concepts tend to appear in the same image (e.g., the global concepts of human face and human body appearing in the same image, the global concepts of a rider and a bike appearing in the same image, etc.). When taken together, these relationships based on visual concepts regularize the self-supervised learning process. The visual concept framework 130 includes at least an augmenter 200, an image segmenter 210, and a visual concept extractor 220. The visual concept framework 130 may include more components or less components than that shown in FIG. 2 provided that the visual concept framework 130 is configured to provide similar functions and/or operations, as described herein.

As aforementioned, the visual concept framework 130 is configured to provide a self-supervised pixel representation learning method for visual concept extraction to at least one machine learning system 140. The machine learning system 140 includes a CNN, any suitable encoding network, any suitable artificial neural network model, or any number and combination thereof. For example, in FIG. 2, the machine learning system 140 comprises a Siamese network. The Siamese network includes a first CNN 140A and a second CNN 140B, which are identical and which share the same weights and model parameters. In this example, the first CNN 140A is configured to receive image data (e.g., first augmented image) as input and generate pixel embeddings or feature representations for that image data as output. The second CNN 140B is configured to receive image data (e.g., second augmented image) as input and generate pixel embeddings or feature representations for that image data as output. More specifically, for each pixel p, the machine learning system 140 is configured to implement the embedding function 4 to generate a feature representation or a pixel embedding $z_p$ in an embedding space of dimension D, which are then used to derive the semantic segmentation of input images. In addition, the machine learning system 140 is configured to update its model parameters upon receiving loss data from the visual concept extractor 220.

The augmenter 200 provides data augmentation to improve the learning of visual representations. Specifically, the augmenter 200 is configured generate at least two augmented views for each image with multiple data augmentation operations (e.g., random cropping, random color jittering, etc.). The image, which serves as a basis for the generation of the two augmented images, may be referred to as a source image. Upon generating the augmented images, the augmenter 200 is configured to provide a first augmented image (e.g., "AUG IMAGE 1") to the first CNN 140A and a second augmented image (e.g., "AUG IMAGE 2") to the second CNN 140B, as shown in FIG. 2. In addition, the augmenter 200 is configured to provide the first augmented image and the second augmented image to the image segmenter 210. With this data augmentation, the visual concept framework 130 is enabled to force consistent pixel embeddings between the augmented views.

Figure 3:
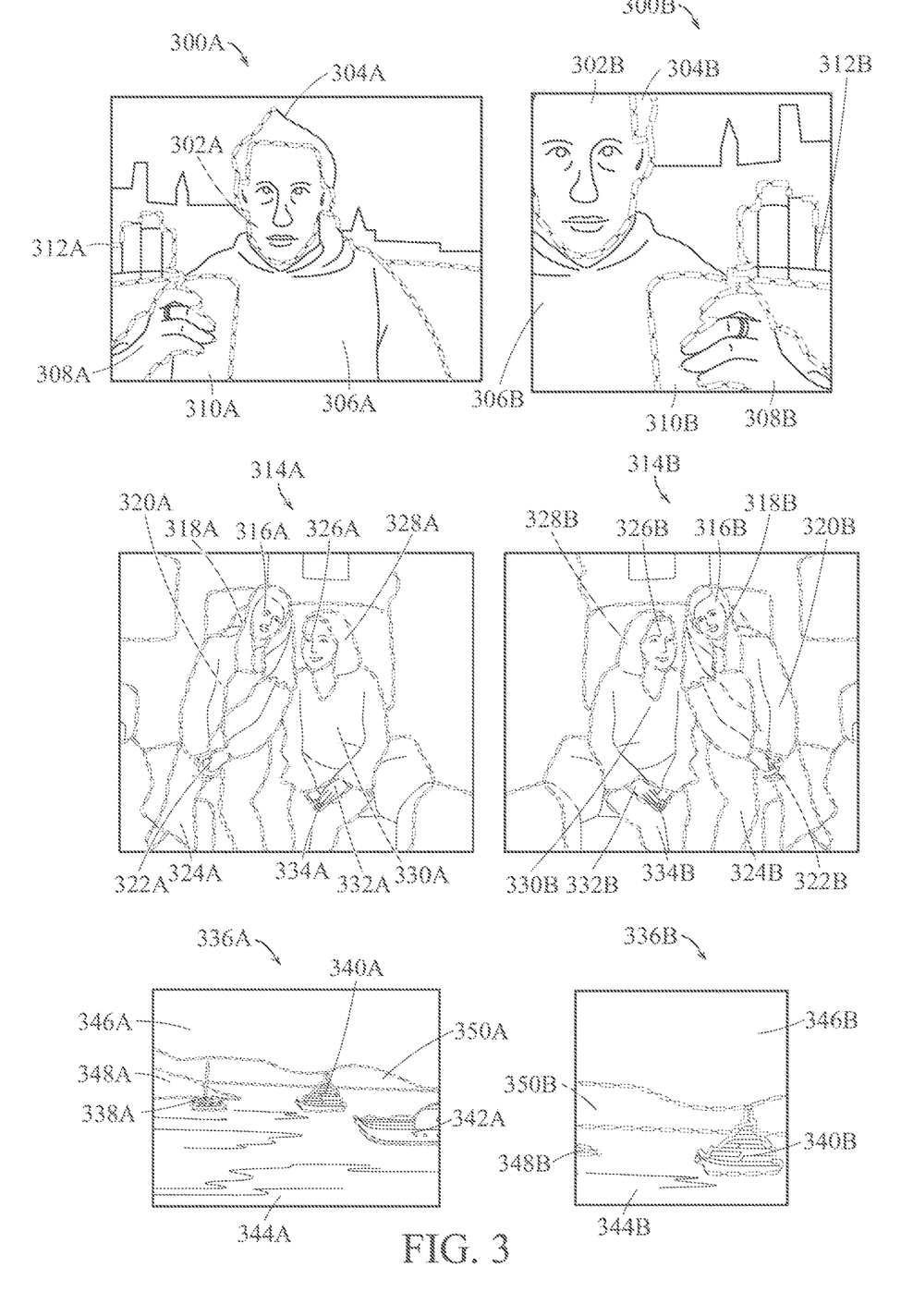
FIG. 3 shows examples of sets of augmented images together with corresponding pseudo segment data according to an example embodiment of this disclosure.

FIG. 3 illustrates non-limiting examples of sets of augmented images, which are generated by the augmenter 200. For example, FIG. 3 shows a first set of augmented images. The first set of augmented images include augmented image 300A and augmented image 300B, which provide different views or different versions of a source image in which a man is holding a cup. In addition, FIG. 3 shows a second set of augmented images. The second set of augmented images include augmented image 314A and augmented image 314B, which provide different views or different versions of a source image in which a first lady and a second lady are sitting together on a chair. As yet another example, FIG. 3 shows a third set of augmented images. The third set of augmented images include augmented image 336A and augmented image 336B, which provide different views or different versions of a source image in which boats are on the water with sky and land in the background. These sets of augmented images illustrate non-limiting examples of the output of the augmenter 200 and the input of the machine learning system 140 and the input of the image segmenter 210. These sets of augmented images may be included in a dataset, which contains at least a suitable amount of augmented images to train the machine learning system 140.

Referring back to FIG. 2, as pixel-wise labels are not available, the visual concept framework 130 includes an image segmenter 210. The image segmenter 210 is configured to receive at least the first augmented image and the second augmented image as input. The image segmenter 210 is configured to generate image segmentation data (e.g., "PSEUDO SEGMENT DATA 1") based on the first augmented image. The image segmenter 210 is also configured to generate image segmentation data (e.g., "PSEUDO SEGMENT DATA 2") based on the second augmented image. In this regard, without requiring pixel-wise labels, the visual concept framework 130 is configured to provide self-supervised training based on pseudo image segments of visually coherent regions. These pseudo image segments of visually coherent regions may be derived from super-pixels or contours. In this regard, for instance, the image segmenter 210 may include an edge detection program, which provides a same label to pixels within the boundary of a segment to indicate that each of those pixels belong to that same segment. The image segmenter 210 provides image segmentation data to the visual concept extractor 220 such that a given pixel may be identified as belonging to a particular segment (e.g., a set of pixels or an image object) or pseudo image segment of a given image (or a set of augmented images based on the same source image).

FIG. 3 shows each augmented image together with pseudo image segments. In this regard, the pseudo image segments are illustrated to provide visualizations of the information conveyed by the pseudo segment data. With the pseudo segment data, the visual concept extractor 220 is configured to identify and extract visually coherent regions or segments of pixels, as well as the pixel embeddings that correspond to those pixels. For example, in response to receiving corresponding pseudo segment data from the image segmenter 210, the visual concept extractor 220 is configured to identify a face segment 302A, a hair segment 304A, a body segment 306A a hand segment 308A, a cup segment 310A, a drinks segment 312A, as well as a number of other segments (e.g., a background segment, a table segment, etc.) in the augmented image 300A. Also, in response to receiving corresponding pseudo segment data from the image segmenter 210, the visual concept extractor 220 is also configured to identify a face segment 302B, a hair segment 304B, a body segment 306B, a hand segment 308B, a cup segment 310B, a drinks segment 312B, as well as a number of other segments (e.g., a background segment, a table segment, etc.) in the augmented image 300B. In addition, with respect to the augmented image 314A, the visual concept extractor 220 is configured to identify a face segment 316A, a hair segment 318A, a body segment 320A, a hand segment 322A, a legs segment 324A, a face segment 326A, a hair segment 328A, a body segment 330A, a hand segment 332A, a legs segment 334A, as well as a number of other segments (e.g., a chair segment, a floor segment, a lamp segment, a brick wall segment, etc.) based on the corresponding pseudo segment data. With respect to the augmented image 314B, the visual concept extractor 220 is configured to identify a face segment 316B, a hair segment 318B, a body segment 320B, a hand segment 322B, a legs segment 324B, a face segment 326B, a hair segment 328B, a body segment 330B, a hand segment 332B, a legs segment 334B, as well as a number of other segments (e.g., a chair segment, a floor segment, a lamp segment, a brick wall segment, etc.). Furthermore, as another example, regarding the augmented image 336A, the visual concept extractor 220 is configured to extract a boat segment 338A, a boat segment 340A, a boat segment 342A, a water segment 344A, a sky segment 346A, a land segment 348A, and a land segment 350A based on corresponding pseudo segment data. The visual concept extractor 220 is also configured to extract a boat segment 340B, a water segment 344B, a sky segment 346B, a land segment 348B, and a land segment 350B based on corresponding pseudo segment data.

Referring back to FIG. 2, the visual concept extractor 220 is configured to train the machine learning system 140, particularly the pixel embedding function, by leveraging properties of visual concepts learned from the pseudo segment data. More specifically, for example, the visual concept extractor 220 uses at least three types of relationships between pixels and concepts to guide the self-supervised learning. These relationships include the relationships between pixels and local concepts, the relationships between local concepts and global concepts, as well as the relationships relating to the co-occurrence of different concepts. For example, in FIG. 2, the visual concept extractor 220 includes a local concept extractor 230, a global concept extractor 240, and a co-occurrence extractor 250 to identify, extract, use, and/or leverage at least these three relationships. The visual concept extractor 220 is configured to receive the pixel embeddings from the machine learning system 140 and the pseudo segment data from the image segmenter 210 as input data. The visual concept extractor 220 is configured to process this input data, identify visual concepts based on the input data, leverage different relationships among the visual concepts, and generate a total loss based on the visual concepts as output data to update one or more model parameters of the machine learning system 140. The visual concept extractor 220 may include more components or less components than that shown in FIG. 2 provided that the visual concept extractor 220 is configured to provide similar functions and/or operations, as described herein.

Figure 4:
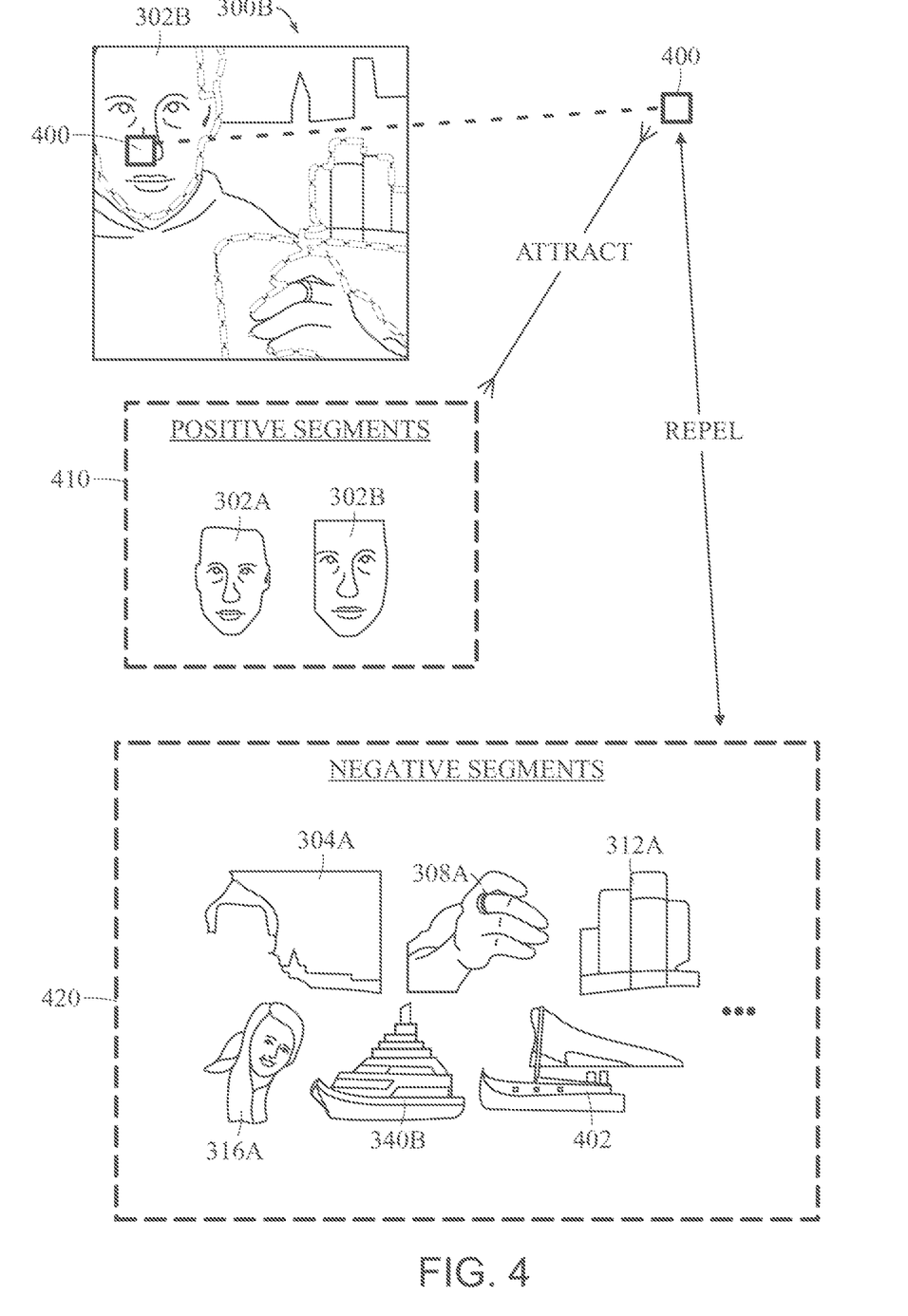
FIG. 4 is a conceptual diagram that provides a visualization of a relationship between a given pixel and local concepts with respect to a positive sample of image segments and a negative sample of image segments according to an example embodiment of this disclosure.

The local concept extractor 230 is configured to train the pixel embeddings to conform with visually coherent regions, namely local concepts, in each image. The local concept extractor 230 leverages the idea that pixels within visually coherent regions should have similar representations in the embedding space. To this end, the local concept extractor 230 defines a local segmentation loss L: to learn pixel representations with a contrastive representation learning approach. Given the augmented views for a batch of images (FIG. 3), the local concept extractor 230 is configured to derive each pixel's positive and negative segments, denoted by $S^+$ and $S^-$ respectively, based on the pseudo segment data obtained from the image segmenter 210. For a pixel p, the local concept extractor 230 is configured to designate that (i) the pixel's positive segments include the segments to which the pixel belongs to in both augmented images, and (ii) the pixel's negative segments include the other remaining segments to which the pixel does not belong within the dataset (FIG. 4). Then, the local concept extractor 230 is configured to compute the local segmentation loss $L_s$. The local segmentation loss $L_s$ is defined as the pixel-to-segment contrastive loss, as expressed in equation 1.

$$L_s(p) = -\log \frac{\sum_{s \in S+} \exp(sim(z_p, z_s)K)}{\sum_{s \in S+ \cup S-} \exp(sim(z_p, z_s)K)} \quad \text{[Equation 1]}$$

In equation 1, K is the concentration constant and sim $(z_p, z_s)$ is the cosine similarity between the feature representation $z_p$ of a pixel p and the feature representation $z_s$ of a segment s. The feature representation $z_s$ is defined as the average representation of the pixels within the segment s, as expressed in equation 2.

$$z_s = \sum_{p \in s} \frac{z_p}{\lceil s \rceil} \quad \text{[Equation 2]}$$

FIG. 4 provides a visualization of a relationship between a given pixel and local concepts with respect to a positive sample of image segments and a negative sample of image segments. More specifically, in FIG. 4, the given image is the augmented image 300B (FIG. 3) while the given pixel 400 is identified as belonging to the visually coherent region of "face" or the face segment 302B. The local concept extractor 230 is configured to designate the positive sample with positive local segments 410, which include the face segment 302A and the face segment 302B of the first set of augmented images. In addition, the local concept extractor 230 is configured to designate the negative sample with negative local segments 420, which include all remaining segments of the dataset after removing the positive local segments therefrom. For instance, as non-limiting examples, FIG. 4 shows a subset of the negative local segments 420, which include a hair segment 304A, a hand segment 308A, a drinks segment 312A, a face segment 316A, a boat segment 340B, and a boat segment 402, as well as other segments (not shown). In this case, the another boat segment 402 is taken from another augmented image, which is not shown in FIG. 3 but is included in the same dataset. As illustrated in FIG. 4, these negative local segments do not contain the given pixel 400. The local concept extractor 230 is configured to attract the positive local segments 410 to the given pixel 400 while repelling the negative local segments 420 away from the given pixel 400.

Referring back to FIG. 2, the global concept extractor 240 is configured to group the local concepts extracted from individual images into global concepts (i.e., clusters of image segments with similar semantic meanings) for the entire dataset. The global concept extractor 240 is configured to introduce the global concepts in recognition of the following observations. Image segments with similar visual appearance may locate at different regions of the same image or even different images, such as the human faces shown in the second set of augmented images of FIG. 3. Since the image segments of the two different human faces belong to different local concepts, those image segments are considered to be negative examples with respect to each other. Hence, their feature representations will be pushed away from each other if only considering local concepts, which will eventually hurt the performance of semantic segmentation. Moreover, the visual concept framework 130 is configured to recognize that the local concepts relate to individual images, but do not capture visual concepts across the entire dataset.

Figure 5:
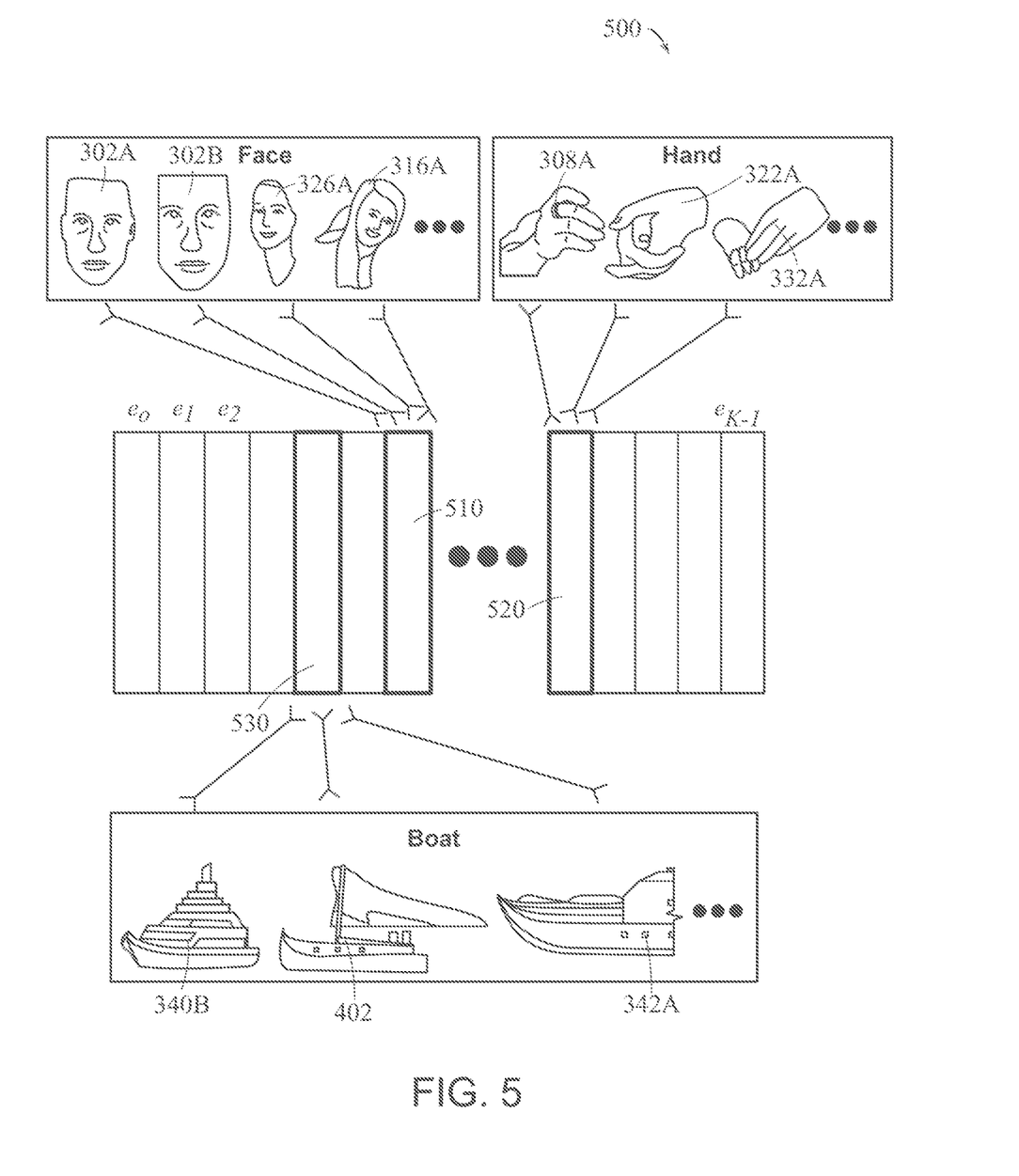
FIG. 5 is a conceptual diagram that provides a visualization of a lookup mechanism for global concepts that associates discrete representations of concepts with clusters of image segments based on vector quantization according to an example embodiment of this disclosure.

The global concept extractor 240 includes VQ to learn global visual concepts that extract clusters of image segments with similar semantic meanings from the dataset (FIG. 5). For the segments that belong to the same global concept, the global concept extractor 240 implements a VQ loss $L_v$ to make their representations close to each other. Specifically, the global concept extractor 240 is configured to train a VQ dictionary. The VQ dictionary contains a set of discrete representations for concept centers, denoted as $e_0$, $e_1, \ldots e_{K-1}$, where K is the number of concepts and $e_i$ is the representation of i-th concept. For each training iteration, the global concept extractor 240 is configured to assign each segment s to the global concept k with the nearest representation, as expressed in equation 3, where sim $(z_s, e_i)$ is the cosine similarity between those representations.

$$k = \text{argmax}_i \text{sim}(z_s, e_i) \quad \text{[Equation 3]}$$

The global concept extractor 240 uses the cosine similarity instead of the Euclidean distance because the representations are learned on a hypersphere. Then, the global concept extractor 240 maximizes the cosine similarity between the feature representations of the segments and the corresponding concepts, as expressed in equation 4, where the first part of this function is used to update the VQ dictionary (i.e., cluster centers) as the stop gradient operator sg is applied on the feature representation of the segments. Similarly, the second part is used to update the feature representations of the segments while fixing the VQ dictionary. In addition, the global concept extractor 240 is configured to use the commitment constant $\beta$ to control the learning rate of the feature representations of the segments. In this regard, the VQ dictionary captures discrete representations with semantic meanings (e.g., human faces, boats, etc.) for the entire dataset. The global concept extractor 240 uses the VQ dictionary to learn the relationships between different global concepts, such as boats and water, which can be exploited to further improve the pixel embeddings.

$$L_v = (1 - \text{sim}(sg(z_s), e_k)) + \beta(1 - \text{sim}(z_s, sg(e_k))) \quad \text{[Equation 4]}$$

FIG. 5 is a conceptual diagram that illustrates a visualization of a lookup mechanism for determining global concepts according to an example embodiment. More specifically, FIG. 5 shows a visualization of the VQ dictionary 500, which includes discrete feature representations of the concept centers, denoted as $e_0, e_1, \ldots e_{K-1}$. The global concept extractor 240 employs a VQ method to group local concepts with similar feature representations (or similar semantic meanings) into global concepts. The discrete feature representations (or concept vectors) of the global concepts form the VQ dictionary 500, which captures the semantic meanings of segment clusters over the entire dataset. For instance, in FIG. 5, the concept vector 510 represents the global concept of "Face," which includes various "face" segments (e.g., face segment 302A, face segment 302B, face segment 326A, face segment 316A, etc.) that are extracted across the entire dataset. As another example, the concept vector 520 represents the global concept of "Hand," which includes various "hand" segments (e.g., the hand segment 308A, the hand segment 322A, the hand segment 332A, etc.) that are extracted across the entire dataset. In addition, as yet another example, the concept vector 530 represents the global concept of "Boat," which includes various "boat" segments (e.g., the boat segment 340B, the boat segment 402, the boat segment 342A, etc.) that are extracted across the entire dataset.

Referring back to FIG. 2, the co-occurrence extractor 250 is configured to use the co-occurrence of different global concepts to further improve the pixel embeddings. The motivation is that global concepts with relevant semantic meanings tend to co-occur in the same image such as the human face, human hair, and human body. However, the feature representations of relevant concepts (e.g., different human body parts) will be pushed away from each other as they belong to different global concepts when there are no co-occurrence constraints.

The co-occurrence extractor 250 introduces the co-occurrence loss $L_c$ to attract the representations of pixels and segments whose global concepts often co-occur in the same image. Different from other work on weakly supervised segmentation that uses image tags to obtain the co-occurrence, the visual concept extractor 220 is configured to exploit the VQ dictionary without additional supervision. More specifically, given a pixel p, the co-occurrence extractor 250 is configured to define its positive and negative segments based on the co-occurrence of the global concepts derived from the VQ dictionary. Specifically, the co-occurrence extractor 250 is configured to determine which global concept the pixel belongs by looking up the segment containing that pixel in the VQ dictionary. Then, the co-occurrence extractor 250 defines (i) the pixel's positive segments C+ to be the segments that co-occur with the pixel's concept in the same image, and (ii) the pixel's negative segments C⁻ to be the remaining segments across the dataset after removing the pixel's positive segments C+ therefrom. For the given pixel p, the pixel embedding is then trained based on a contrastive loss, which is expressed as the co-occurrence loss $L_c$ in equation 5. The equation for the co-occurrence loss $L_c$ differs from the equation for the local segmentation loss $L_s$ with respect to how each loss function defines its positive segments and negative segments.

$$L_c(p) = -\log \frac{\sum_{s \in C+} \exp(sim(z_p, z_s)K)}{\sum_{s \in C+ \cup C-} \exp(sim(z_p, z_s)K)}$$ [Equation 5]

Figure 6:
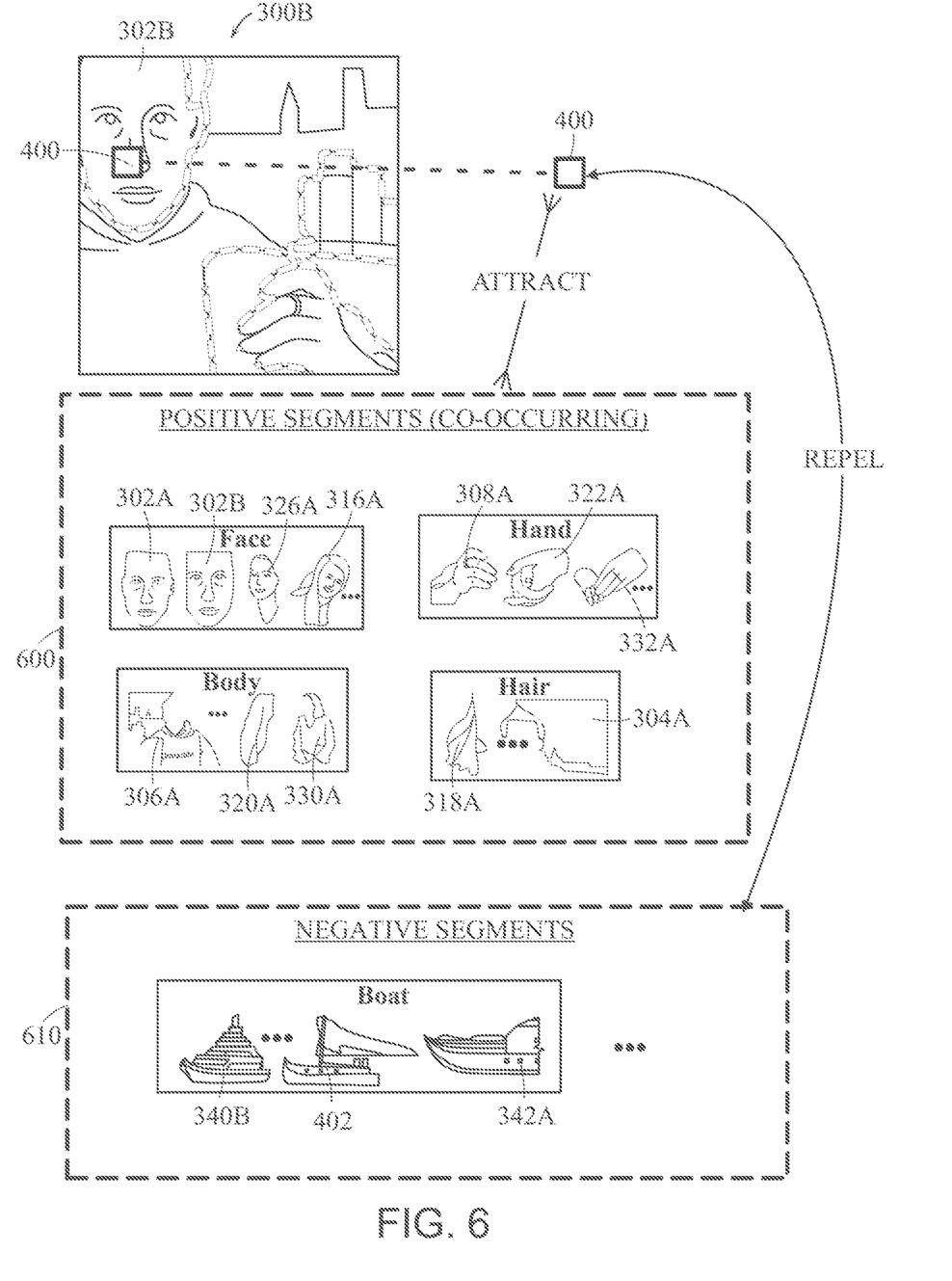
FIG. 6 is a conceptual diagram that provides a visualization of a relationship between a given pixel and co-occurring concepts with respect to a positive sample of image segments and a negative sample of image segments according to an example embodiment of this disclosure.

FIG. 6 is a conceptual diagram that provides a visualization of a relationship between a given pixel and co-occurring concepts with respect to a positive sample of image segments and a negative sample of image segments according to an example embodiment. More specifically, in FIG. 6, the given image is the augmented image 300B (FIG. 3) while the given pixel 400 is identified as belonging to the face segment 302B. In this case, the co-occurrence extractor 250 is configured to determine that the given pixel 400 belongs to the face segment 302B with respect to a local concept of the augmented image 300B. Upon looking up the face segment 302B in the VQ dictionary 500, the co-occurrence extractor 250 determines that the face segment 302B belongs to the concept vector 510 and the global concept of "Face," as shown in FIG. 5. In this case, the co-occurrence extractor 250 is configured to designate that a positive sample includes all face segments that belong to the concept vector 510 and thus the global concept of "Face." In addition, the co-occurrence extractor 250 is configured to identify all other segments that co-occur with that face segment 302B in that augmented image 300B (and also the augmented image 300A) via its pseudo segment data and extract the corresponding global concepts for those other segments via the VQ dictionary 500. The co-occurrence extractor 250 is further configured to include all co-occurring segments for each of those co-occurring global concepts as a part of the positive sample. For instance, since the global concepts of "Hand," "Body," and "Hair" co-occur with the global concept of "Face" (associated with the given pixel 400) in the augmented image 300B (and the augmented image 300A) to which the given pixel 400 belongs, then the positive sample includes all of the segments associated with those global concepts, as shown in FIG. 5 and FIG. 6. The co-occurrence extractor 250 is configured to attract this positive sample in relation to the corresponding pixel embedding of the given pixel 400.

Meanwhile, the co-occurrence extractor 250 is configured to designate a negative sample with respect to a corresponding pixel embedding of the given pixel 400. The negative sample includes the feature representations of pixels and segments whose global concepts, as derived from the VQ dictionary 500, do not co-occur with the global concept of the given segment of the given pixel. For example, the global concept of "Boat" does not co-occur with the first set of augmented images (i.e., augmented image 300A and augmented image 300B) in which the given pixel 400 belongs. As such, the co-occurrence extractor 250 is configured to designate all segments of the global concept of "Boat" as being a part of the negative sample. The co-occurrence extractor 250 is configured to repel the negative sample, which includes the global concept of "Boat" (and hence all boat segments across the dataset), in relation to the corresponding pixel embedding of the given pixel 400. As described above, these features are advantageous in improving pixel representation by defining the co-occurrence of visual concepts at the global level.

Referring back to FIG. 2, the visual concept extractor 220 leverages various relationships between pixels and visual concepts to regularize the self-supervised learning process. In this regard, the visual concept extractor 220 computes a total loss L, as expressed in equation 6, which takes into account these different relationships. More specifically, the visual concept extractor 220 uses the total loss to train the feature representation $z_p$ of a pixel p. The total loss L is the weighted combination of the aforementioned three loss terms (e.g., $L_s$, $L_v$, and $L_c$), as expressed in equation 6, where $\lambda_s$, $\lambda_v$, and $\lambda_c$ are the corresponding weights for each loss term.

$$L(p) = \lambda_s L_s(p) + \lambda_v L_v(p) + \lambda_c L_c(p)$$ [Equation 6]

As described in this disclosure, the embodiments provide a number of advantages and benefits. For example, the embodiments include a novel unsupervised semantic segmentation framework based on self-supervised representation learning at the pixel level. In this regard, since the visual concept framework 130 comprises self-supervised representation learning, the embodiments are advantageous in being able to provide learned pixel embeddings without requiring human annotations. Also, as another advantage, the embodiments use pseudo image segments generated by weak priors (e.g., a contour detector or superpixels) without requiring additional information such as hierarchical groups or saliency masks.

In addition, the embodiments are configured to learn visual concepts for image segments and use the relationships between pixels and these visual concepts to improve the pixel representation. The embodiments use at least three types of relationships between pixels and visual concepts to regularize the self-supervised representation learning and hence improve the learned pixel embeddings. The learned pixel embeddings can then be employed for semantic segmentation by k-means clustering or fine-tuning. Moreover, semantic segmentation can be applied to a broad range of applications, such as autonomous driving, augmented reality, medical image analysis, retail applications, security applications, manufacturing applications, robotic navigation, and other suitable technologies, by recognizing and understanding elements of an image at the pixel level.

Figure 7:
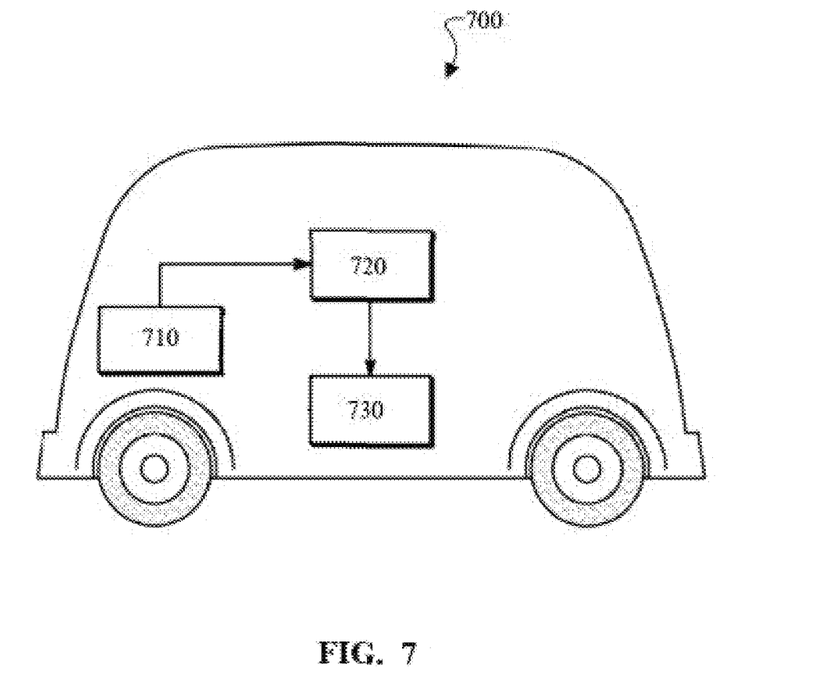
FIG. 7 illustrates a non-limiting example of the trained machine learning system being employed in an autonomous driving application according to an example embodiment of this disclosure.

FIG. 7 provides a non-limiting example of an autonomous driving application, which uses the trained machine learning system 140 for semantic segmentation to contribute to the control of the vehicle 700. In FIG. 7, the vehicle 700 includes at least a sensor system 710, a control system 720, and an actuator system 730. For convenience of discussion, the control system 720 may include a number of components of the system 100 or a number of similar components to those components of the system 100. In this example, the control system 720 further employs a computer vision application, which is stored in at least one non-transitory computer readable medium and which uses the trained machine learning system 140 to identify objects in images at the pixel level. The images may be generated by one or more sensors of the sensor system 710 of the vehicle 700. The sensor system 710 may be similar to the sensor system 170. Additionally or alternatively, the images may be generated by one or more processors of the control system 720 upon receiving sensor data from the sensor system 710. In this example, the control system 720 is configured to generate control data in response to determining that the object in the image is, for instance, a pedestrian together with corresponding location data of the pedestrian via the computer vision application. In this non-limiting example, the actuator system 730 is configured to actuate at least the braking system to stop the vehicle 700 upon receiving the actuator control data. In this regard, the actuator system 730 may include a braking system, a propulsion system, an engine, a drivetrain, a steering system, or any number and combination of actuators of the vehicle 700. The actuator system 730 is configured to control the vehicle 700 so that the vehicle 700 follows rules of the roads and avoids a collision based at least on the semantic segmentation data. In this regard, FIG. 7 merely provides a non-limiting example of an autonomous driving application that employs the trained machine learning system 140 for semantic segmentation. As aforementioned, the trained machine learning system 140 may also be employed in other tasks related to computer vision, as well as in various other technologies and fields.

Furthermore, the embodiments are advantageous in that they are enabled to extract visual concepts from a dataset and offer a global semantic understanding about the dataset. The embodiments are configured to produce a set of global visual concepts that are semantically meaningful to humans. Because there are a finite number of discrete visual vocabulary, they are easier to explore and interpret comparing with the high dimensional embeddings. Moreover, the accuracy and generalizability of the learned pixel embeddings has been demonstrated on challenging tasks, such as semantic segmentation and instance mask tracking. In general, the results show that the embodiments provide consistent and substantial improvements over recent unsupervised semantic segmentation approaches, and also demonstrate that visual concepts can reveal insights into image datasets.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system, the method comprising:
   generating a first augmented image from a source image, the first augmented image being included in a dataset with other augmented images based on other source images;
   generating first pseudo segment data based on the first augmented image;
   generating other pseudo segment data based on the other augmented images;
   generating, via the machine learning system, pixel embeddings for the dataset, the pixel embeddings including a corresponding pixel embedding for a given pixel;
   identifying a corresponding segment of the given pixel and non-corresponding segments of the given pixel within the first augmented image via the first pseudo segment data;
   identifying other segments for the other augmented images via the other pseudo segment data;
   identifying a corresponding concept associated with the corresponding segment;
   identifying additional segments in the dataset that are associated with the corresponding concept, the additional segments being a subset of the other segments;
   computing a first contrastive loss for the given pixel based on the corresponding pixel embedding in relation to (a) a first positive sample that includes the corresponding segment, and (b) a first negative sample that includes the non-corresponding segments and the other segments;
   computing a second contrastive loss for the given pixel based on the corresponding pixel embedding in relation to (a) a second positive sample that includes a co-occurring segment set, the co-occuring segment set including the corresponding segment, the non-corresponding segments, and the additional segments and (b) a second negative sample that includes remaining segments of the dataset after removing the co-occurring segment set;
optimizing a total loss for the given pixel, the total loss taking into account the first contrastive loss and the second contrastive loss; and
updating parameters of the machine learning system based on the total loss.

2. The computer-implemented method of claim 1, further comprising:
determining a corresponding segment embedding for the corresponding segment; and
computing a global concept loss based on a similarity determination between the corresponding segment embedding and a concept vector of the corresponding concept,
wherein the total loss for the given pixel takes into account the global concept loss.

3. The computer-implemented method of claim 2, wherein the total loss is a weighted combination of the first contrastive loss, the global concept loss, and the second contrastive loss.

4. The computer-implemented method of claim 2, wherein:
the concept vector of the corresponding concept is identified by looking up the corresponding segment embedding via a vector quantization dictionary, and
the vector quantization dictionary associates the concept vector of the corresponding segment embedding with the corresponding segment embedding and additional segment embeddings of the additional segments.

5. The computer-implemented method of claim 1, wherein the machine learning system includes an embedding neural network model with convolutional neural network layers.

6. The computer-implemented method of claim 1, further comprising:
generating a second augmented image from the source image, the second augmented image being included in the dataset;
generating second pseudo segment data based on the second augmented image; and
identifying a supplemental corresponding segment and supplemental non-corresponding segments of the given pixel within the second augmented image via the second pseudo segment data,
wherein,
the first positive sample further includes the supplemental corresponding segment,
the first negative sample further includes the supplemental non-corresponding segments, and
the co-occurring segment set further includes the supplemental corresponding segment and the supplemental non-corresponding segments.

7. The computer-implemented method of claim 6, wherein:
the machine learning system includes a Siamese network with a first embedding neural network and a second embedding neural network;
the first embedding neural network is configured to generate first pixel embeddings in response to receiving the first augmented image;
the second embedding neural network is configured to generate second pixel embeddings in response to receiving the second augmented image; and
the pixel embeddings include the first pixel embeddings and the second pixel embeddings.

8. A computer-implemented method for self-supervised semantic segmentation, the method comprising:
obtaining a source image;
generating a first augmented image and a second augmented image from the source image, the first augmented image and the second augmented image being in a dataset that includes other augmented images;
generating first image segmentation data from the first augmented image;
generating second image segmentation data from the first augmented image;
generating, via a machine learning system, pixel embeddings for the dataset, the pixel embeddings including a corresponding pixel embedding for a given pixel;
identifying a first set of segments that the given pixel belongs in the first augmented image and the second augmented image via the first image segmentation data and the second image segmentation data;
identifying a second set of segments across the dataset, the second set of segments not including the given pixel;
computing a local segmentation loss for the given pixel based on the corresponding pixel embedding that involves attracting the first set of segments while repelling the second set of segments;
computing a global concept loss based on a similarity determination between the first set of segments and a concept vector of a corresponding concept, the corresponding concept categorizing a global set of segments based on semantic meaning, the global set of segments including the first set of segments and other sets of segments with the same semantic meaning across the dataset;
optimizing a total loss that takes into account the local segmentation loss and the global concept loss; and
updating parameters of machine learning system based on the total loss.

9. The computer-implemented method of claim 8, further comprising:
identifying accompanying concepts that co-occur with the corresponding concept in the first augmented image and the second augmented image; and
computing a co-occurrence loss for the given pixel that is based on attracting a third set of segments while repelling a fourth set of segments,
wherein,
the third set of segments are generated from a third set of segments, the third set of segments include the global set of segments associated with the corresponding concept and other global sets of segments associated with the accompanying concepts, and
the fourth set of segments are associated with other concepts that do not co-occur with the corresponding concept.

10. The computer-implemented method of claim 9, wherein the total loss further takes into account the co-occurrence loss such that the total loss is a weighted combination of the local segmentation loss, the global concept loss, and the co-occurrence loss.

11. The computer-implemented method of claim 8, further comprising:
identifying the concept vector of the corresponding concept that is nearest to the first set of segments via a vector quantization dictionary.

12. The computer-implemented method of claim 8, wherein:

the first augmented image includes a first view of the source image with at least one image modification;

the second augmented image includes a second view of the source image with at least one image modification; and the first view is different from the second view.

13. The computer-implemented method of claim 8, wherein the machine learning system includes an embedding neural network having at least one or more convolutional neural network layers.

14. The computer-implemented method of claim 8, wherein:

the machine learning system includes a Siamese network with a first embedding neural network and a second embedding neural network;

the first embedding neural network is configured to generate first pixel embeddings in response to receiving the first augmented image;

the second embedding neural network is configured to generate second pixel embeddings in response to receiving the second augmented image; and the pixel embeddings include the first pixel embeddings and the second pixel embeddings.

15. A non-transitory computer readable medium having computer readable data including instructions stored thereon, the computer readable data being executable by one or more processors to perform a method that comprises:

obtaining a source image;

generating a first augmented image and a second augmented image from the source image, the first augmented image and the second augmented image being in a dataset that includes other augmented images;

generating first image segmentation data from the first augmented image;

generating second image segmentation data from the first augmented image;

generating, via a machine learning system, pixel embeddings for the dataset, the pixel embeddings including a corresponding pixel embedding for a given pixel;

identifying a first set of segments that the given pixel belongs in the first augmented image and the second augmented image via the first image segmentation data and the second image segmentation data;

identifying a second set of segments across the dataset, the second set of segments not including the given pixel;

computing a local segmentation loss for the given pixel based on the corresponding pixel embedding that involves attracting the first set of segments while repelling the second set of segments;

computing a global concept loss based on a similarity determination between the first set of segments and a concept vector of a corresponding concept, the corresponding concept categorizing a global set of segments based on semantic meaning, the global set of segments including the first set of segments and other sets of segments with the same semantic meaning across the dataset;

optimizing a total loss that takes into account the local segmentation loss and the global concept loss; and updating parameters of machine learning system based on the total loss.

16. The non-transitory computer readable medium of claim 15, further comprising:

identifying accompanying concepts that co-occur with the corresponding concept in the first augmented image and the second augmented image; and computing a co-occurrence loss for the given pixel that is based on attracting a third set of segments while repelling a fourth set of segments, wherein, the third set of segments include the global set of segments associated with the corresponding concept and other global sets of segments associated with the accompanying concepts, and the fourth set of segments are associated with other concepts that do not co-occur with the corresponding concept.

17. The non-transitory computer readable medium of claim 16, wherein the total loss further takes into account the co-occurrence loss such that the total loss is a weighted combination of the local segmentation loss, the global concept loss, and the co-occurrence loss.

18. The non-transitory computer readable medium of claim 15, further comprising:

identifying the concept vector of the corresponding concept that is nearest to the first set of segments via a vector quantization dictionary.

19. The non-transitory computer readable medium of claim 15, wherein the machine learning system includes a convolutional neural network model.

20. The non-transitory computer readable medium of claim 15, wherein:

the machine learning system includes a Siamese network with a first embedding neural network and a second embedding neural network;

the first embedding neural network is configured to generate first pixel embeddings in response to receiving the first augmented image;

the second embedding neural network is configured to generate second pixel embeddings in response to receiving the second augmented image; and the pixel embeddings include the first pixel embeddings and the second pixel embeddings.

* * * * *